(12) United States Patent
Kim et al.

(10) Patent No.: US 11,554,643 B2
(45) Date of Patent: Jan. 17, 2023

(54) AIR VENT DEVICE FOR VEHICLE

(71) Applicants: HYUNDAI MOTOR COMPANY, Seoul (KR); KIA MOTORS CORPORATION, Seoul (KR); HYUNDAI MOBIS CO., LTD., Seoul (KR)

(72) Inventors: Joo Hwa Kim, Hwaseong-si (KR); Seung Cheol Kim, Yongin-si (KR); Won Sik Kim, Yongin-si (KR)

(73) Assignees: HYUNDAI MOTOR COMPANY, Seoul (KR); KIA MOTORS CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 199 days.

(21) Appl. No.: 16/884,419

(22) Filed: May 27, 2020

(65) Prior Publication Data
US 2021/0260969 A1 Aug. 26, 2021

(30) Foreign Application Priority Data
Feb. 26, 2020 (KR) .................. 10-2020-0023365

(51) Int. Cl.
*B60H 1/00* (2006.01)
*B60H 1/34* (2006.01)

(52) U.S. Cl.
CPC ....... *B60H 1/3428* (2013.01); *B60H 1/00564* (2013.01); *B60H 1/00671* (2013.01); *B60H 2001/3471* (2013.01)

(58) Field of Classification Search
CPC ............ B60H 1/00564; B60H 1/00664; B60H 1/00671; B60H 1/3414; B60H 1/3428;
(Continued)

(56) References Cited

U.S. PATENT DOCUMENTS 4,377,107 A * 3/1983 Izumi .................... F24F 13/075
454/316
5,470,276 A * 11/1995 Burnell ................. F24F 13/075
454/319

(Continued)

FOREIGN PATENT DOCUMENTS

| CN | 105431316 A | * | 3/2016 | .......... B60H 1/3414 |
| KR | 2019-0131251 A | | 11/2019 | |
| KR | 2020-0017069 A | | 2/2020 | |

OTHER PUBLICATIONS

Machine Translation of Uhlenbusch (Year: 2016).*

*Primary Examiner* — Avinash A Savani
*Assistant Examiner* — Ryan L Faulkner
(74) *Attorney, Agent, or Firm* — McDonnell Boehnen Hulbert & Berghoff LLP

(57) ABSTRACT

An air vent device for a vehicle may be mounted with an upper rear wing and a lower rear wing within an air duct to be linearly movable along the front-rear direction, and be rotatably mounted with an upper air guide wing and a lower air guide wing at the front end portions of the upper rear wing and the lower rear wing, thereby controlling the wind direction of the air downward while the upper air guide wing rotates downward when the upper rear wing moves forward, or controlling the wind direction of the air upward while the lower air guide wing rotates upward when the lower rear wing moves forward.

12 Claims, 3 Drawing Sheets

(58) Field of Classification Search
CPC .. B60H 2001/3471; B60H 2001/00721; B60H 2001/3478; F24F 13/12; F24F 13/1426; F24F 13/10; F15D 1/04
USPC .................................................. 454/154, 155
See application file for complete search history.

(56) References Cited

U.S. PATENT DOCUMENTS

| | | | |
|---|---|---|---|
| 7,399,222 B2* | 7/2008 | Moon | F24F 13/1426 454/236 |
| 10,500,927 B2* | 12/2019 | Araujo Nieto | B60H 1/3421 |
| 11,065,939 B2* | 7/2021 | Lee | B60H 1/3421 |
| 2013/0225058 A1* | 8/2013 | Ross | B60H 1/345 454/155 |
| 2015/0174989 A1* | 6/2015 | Oe | F24F 13/14 454/152 |
| 2017/0282680 A1* | 10/2017 | Tajima | B60H 1/3421 |
| 2020/0376932 A1* | 12/2020 | Nieto | B60H 1/3428 |

* cited by examiner

AIR VENT DEVICE FOR VEHICLE

CROSS REFERENCE TO RELATED APPLICATIONS

This application claims under 35 U.S.C. § 119(a) the benefit of priority to Korean Patent Application No. 10-2020-0023365 filed on Feb. 26, 2020, the entire contents of which are incorporated herein by reference.

BACKGROUND

(a) Technical Field

The present disclosure relates to an air vent device for a vehicle, and more particularly, to a motor-driven air vent device for a vehicle, which may easily control the vertical wind direction of the air discharged into the interior by using a rear wing which performs linear motion, an air guide wing which conducts rotary motion, or the like.

(b) Background Art

Generally, an air vent which discharges air into the interior by an operation of an air conditioner for a vehicle includes a center air vent which is mounted to a center fascia panel between the front surfaces of the driver seat and the passenger seat, side vents which are mounted to crash pads on the front surface sides of the driver seat and the passenger, and the like.

Although an existing air vent may be formed of a structure with a large vertical height while the number of horizontal wings and vertical wings thereof is at least 5 and 6, respectively, thereby easily controlling the direction of the air discharged into the interior toward the passenger's body, there is a drawback in that the size of the air vent is inevitably increased, thereby affecting the package problem with the surrounding components and the design constraint conditions.

Furthermore, as the driver needs to control the vertical wind direction by directly and vertically bending back a knob, which is attached to a horizontal wing among components of the existing air vent, the driver may not pay attention to the front temporarily while driving, thereby also causing a problem in running safety.

In addition, since the existing air vent has a structure in which numerous horizontal wings and vertical wings are inevitably exposed in appearance, the air vent occupies a wide mounting space in the center fascia panel or the crash pad, thereby eventually degrading the degree of freedom of the design of a cluster, an Audio, Video, Navigation (AVN) device, and the like, which are disposed around the air vent.

Accordingly, due to the enlargement of the cluster and the AVN device mounted in the vehicle interior, the mounting position of the air vent tends to move to the lower region of the center fascia panel, and particularly, a slim-type air vent in which the exterior design of the air vent has a low vertical height and a long horizontal length is being applied.

However, the slim-type air vent has a drawback in that it is not possible to conveniently control the vertical direction of the air discharged into the interior.

For example, as the slim-type air vent is mounted to the exit position of the air duct in a structure in which only a single horizontal wing is exposed to the outside, it is inconvenient for the driver to operate by directly holding the single horizontal wing by hand in order to control the vertical wind direction.

The above information disclosed in this Background section is only for enhancement of understanding of the background of the disclosure and accordingly it may contain information that does not form the prior art that is already known in this country to a person of ordinary skill in the art.

SUMMARY

The present disclosure is intended to solve the above conventional problems, and an object of the present disclosure is to provide an air vent device for a vehicle, which is mounted with an upper rear wing and a lower rear wing within an air duct to be movable linearly along the front-rear direction, and is rotatably mounted with an upper air guide wing and a lower air guide wing at the front end portions of the upper rear wing and the lower rear wing, respectively, so that the wind direction of the air may be controlled downward while the upper air guide wing rotates downward when the upper rear wing moves forward, or so that the wind direction of the air may be controlled upward while the lower air guide wing rotates upward when the lower rear wing moves forward.

The present disclosure provides an air vent device for a vehicle configured to include an upper rear wing and a lower rear wing which are movably mounted to the upper portion and the lower portion within an air duct along the front-rear direction, respectively, an upper air guide wing and a lower air guide wing which are rotatably mounted to the front end portions of the upper rear wing and the lower rear wing, respectively, a drive link device rotatably mounted to the side wall within the air duct while being connected to the rear end portions of the upper rear wing and the lower rear wing to linearly move the upper rear wing and the lower rear wing in different directions, an actuator mounted to the outside of the air duct to provide the rotation power to the drive link device, an upper rail formed on the side wall within the air duct to guide the downward rotation of the upper air guide wing when the upper rear wing moves forward, and a lower rail formed on the side wall within the air duct to guide the upward rotation of the lower air guide wing when the lower rear wing moves forward.

The drive link device is composed of a first link which has a rotary shaft connected to the actuator, formed on one side center portion thereof, a second link provided as a structure in which a lower opening pocket into which the upper end portion of the first link is accessibly inserted is formed to be hinge-fastened to the rear end portion of the upper rear wing, and a third link provided as a structure in which an upper opening pocket into which the lower end portion of the first link is accessibly inserted is formed to be hinge-fastened to the rear end portion of the lower rear wing.

In addition, a first slot and a second slot are each formed on the upper end portion and the lower end portion of the first link, a first pin, which is inserted into the first slot to be slidably transferred, is formed at the inlet of the lower opening pocket of the second link, and a second pin, which is inserted into the second slot to be slidably transferred, is formed at the inlet of the upper opening pocket of the third link.

Preferably, an upper guide rail configured to support the forward and backward linear movement of the upper rear wing is formed on the an upper side wall within the air duct, and a lower guide rail configured to support the forward and backward linear movement of the lower rear wing is formed on a lower side wall within the air duct.

The upper rail is formed on an upper side wall within the air duct so that the side end portion of the upper air guide wing is coupled to be slidably moved.

Specifically, the upper rail is formed of a rail structure in which the upper guide pin formed on the side end portion of the upper air guide wing is inserted to be slidably moved forward and backward, and is formed to have a downward tilted trajectory from the rear end portion toward the front end portion.

Accordingly, the upper air guide wing rotates downward when the upper guide pin is moved from the rear end portion of the upper rail to the front end portion thereof while moving forward together when the upper rear wing moves forward to guide the air discharged to the interior downward.

The lower rail is formed on a lower side wall within the air duct so that the side end portion of the lower air guide wing is coupled to be slidably moved.

Specifically, the lower rail is formed of a rail structure in which the lower guide pin formed on the side end portion of the lower air guide wing is inserted to be slidably moved forward and backward, and is formed to have an upward tilted trajectory from the rear end portion toward the front end portion.

Accordingly, the lower air guide wing rotates upward when the lower guide pin is moved from the rear end portion of the lower rail to the front end portion while moving forward together when the lower rear wing moves forward to guide the air discharged to the interior upward.

Preferably, the upper end portion of the outlet of the air duct and a garnish being in close contact therewith are formed of a downward convex curved surface for the COANDA effect, and the lower end portion of the outlet of the air duct and a garnish being in close contact therewith are formed of an upward convex curved surface for the COANDA effect.

The present disclosure provides the following effects through the above configuration.

Firstly, by guiding the wind direction of the air downward while the upper air guide wing rotates downward when the upper rear wing moves forward within the air duct, it is possible to easily control the interior discharge direction of the air downward.

Furthermore, the lower end portion of the outlet of the air duct and the garnish being in close contact therewith are formed of the upward convex curved surface for the COANDA effect, such that the air may flow downward from the interior along the upward convex curved surface, thereby controlling the interior discharge direction of the air downward more easily.

Secondly, by guiding the wind direction of the air upward while the lower air guide wing rotates upward when the lower rear wing moves forward within the air duct, it is possible to easily control the interior discharge direction of the air upward.

Furthermore, the upper end portion of the outlet of the air duct and the garnish being in close contact therewith are formed of the downward convex curved surface for the COANDA effect, such that the air may flow upward from the interior along the downward convex curved surface, thereby controlling the interior discharge direction of the air upward more easily.

Thirdly, only the pair of rear wings and the pair of air guide wings may be required as compared to numerous wind direction control wings configuring the existing general air vent, thereby reducing the number of components and saving the manufacturing costs.

Fourthly, by electrically controlling the vertical wind direction of the air beyond the manual operation by the driver to manually operate the horizontal wing which is included in the existing general air vent or the slim-type air vent, it is possible to contribute to the improvement of convenience of the vehicle and to the high quality thereof.

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given herein below by way of illustration only, and thus are not limitative of the present disclosure, and wherein.

Figure 1:
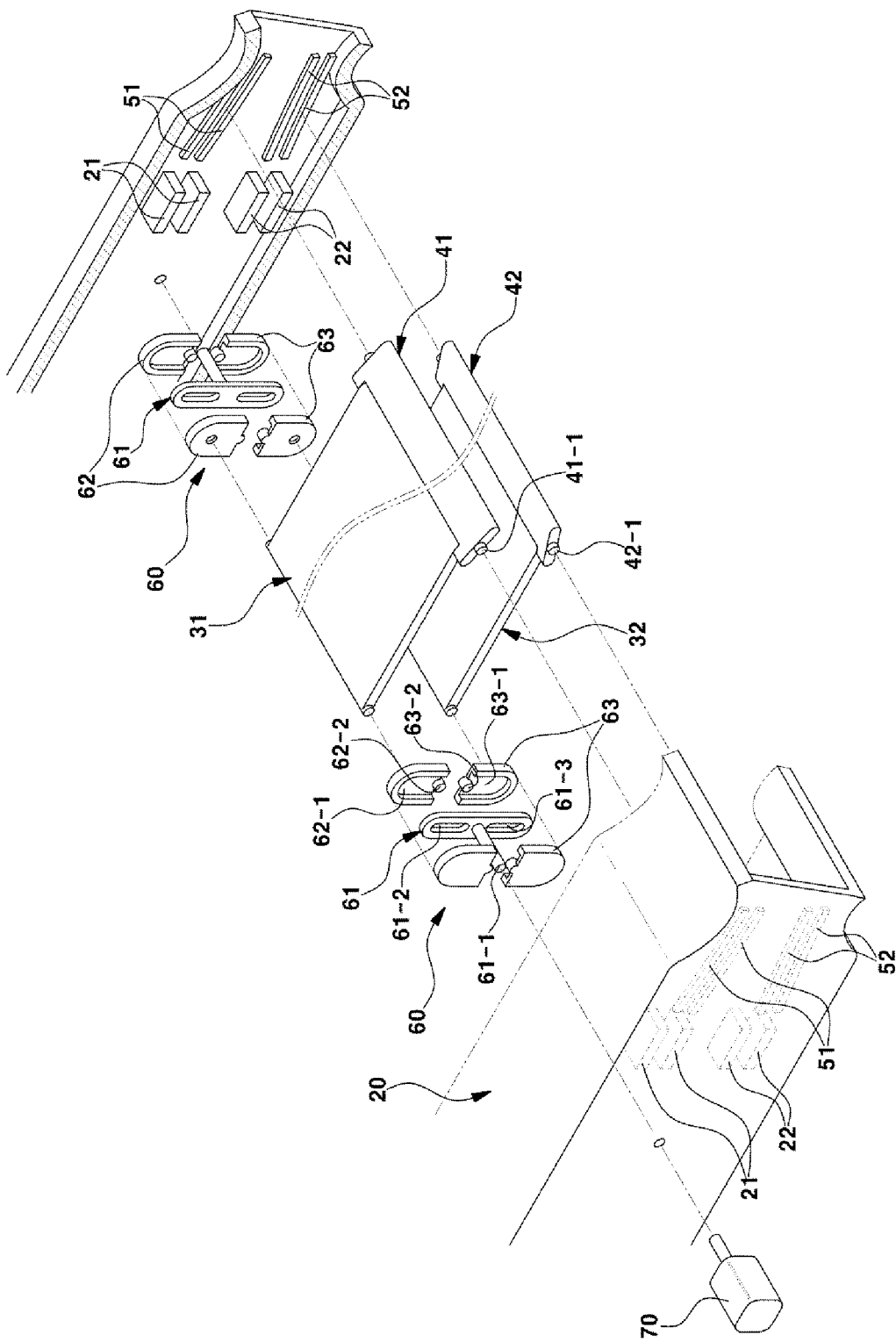
FIG. 1 is an exploded perspective diagram illustrating an air vent device for a vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, positions, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings.

Figure 2:
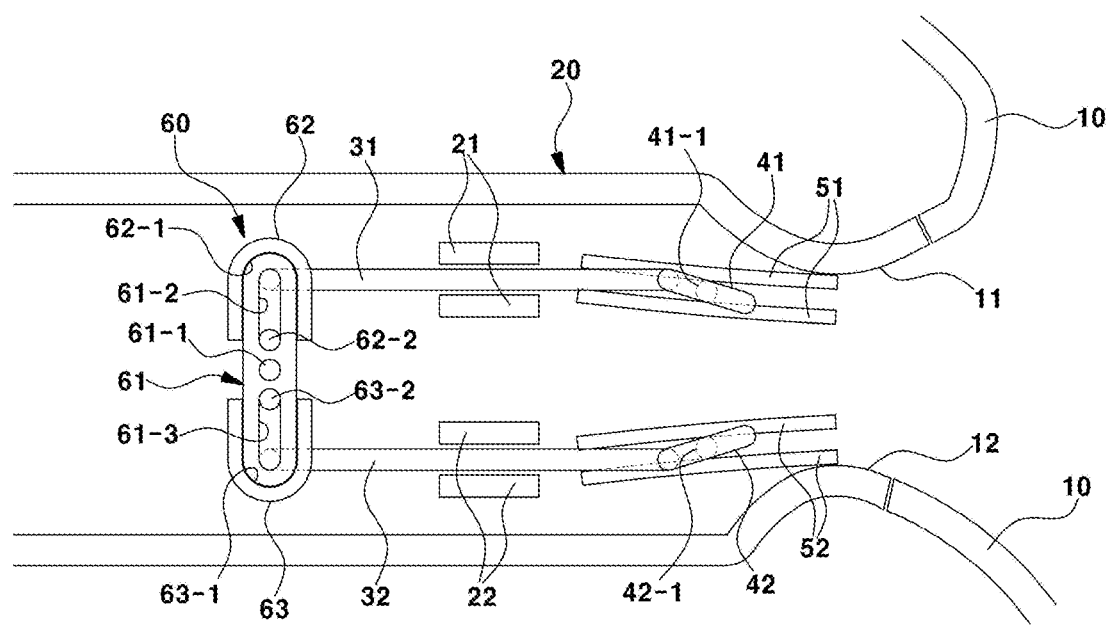
FIG. 2 is a side cross-sectional diagram illustrating the assembled state of the air vent device for the vehicle according to the present disclosure.

FIG. 1 is an exploded perspective diagram illustrating an air vent device for a vehicle according to the present disclosure, FIG. 2 is a side cross-sectional diagram illustrating the assembled state of the air vent device for the vehicle according to the present disclosure, and reference numeral 10 in FIG. 2 denotes a garnish.

The garnish 10 refers to a kind of decoration which is mounted to the position of the air discharge port of the center fascia panel or is mounted at the position of the air discharge port of the crash pad, and an air duct 20, which is the passage of air from an air conditioner toward the interior, is arranged on the rear portion of the garnish 10.

Preferably, the upper end portion of the outlet of the air duct 20 and the garnish 10 being in close contact therewith are formed of a downward convex curved surface 11 for the COANDA effect, and the lower end portion of the outlet of the air duct 20 and the garnish 10 being in close contact therewith are formed of an upward convex curved surface 12 for the COANDA effect.

For reference, the COANDA effect refers to the characteristic in which the fluid such as air flows along the wall surface of the curved surface and the flow direction thereof is changed.

According to the present disclosure, an upper rear wing 31 is arranged on the upper portion within the air duct 20 to be linearly movable in the front-rear direction, and the lower rear wing 32 is arranged on the lower portion thereof to be linearly movable in the front-rear direction.

At this time, the upper rear wing 31 and the lower rear wing 32 are flat plate structures, and are arranged in parallel while maintaining a predetermined vertical interval from each other.

Preferably, the upper rear wing 31 can be tilted toward the upper plate portion of the air duct 20, and the lower rear wing 32 is arranged to be tilted toward the lower plate portion of the air duct 20 so that a space between the upper rear wing 31 and the lower rear wing 32 becomes the main flow path of the air.

In addition, in order to induce the air flowing in the upper space of the air duct 20 to the downward convex curved surface 11, it is preferable to maintain the distance between the upper rear wing 31 and the upper plate portion of the air duct 20 at the minimum distance capable of the smooth air flow.

In addition, in order to induce the air flowing in the lower space of the air duct 20 to the upward convex curved surface 12, it is preferable to maintain the vertical distance between the lower rear wing 32 and the lower plate portion of the air duct 20 at the minimum distance capable of the smooth air flow.

Preferably, upper guide rails 21 configured to support the forward and backward linear movement of the upper rear wing 31 are formed on the upper one of both side walls within the air duct 20, and lower guide rails 22 configured to support the forward and backward linear movement of the lower rear wing 32 are formed on the lower one of both side walls within the air duct 20.

Accordingly, the upper rear wing 31 and the lower rear wing 32 linearly move in a state where both side end portions of the upper rear wing 31 are inserted between the upper guide rails 21 and both side end portions of the lower rear wing 32 are inserted between the lower guide rails 22, the forward and backward linear movements of the upper rear wing 31 and the lower rear wing 32 may be stably conducted.

Here, an upper air guide wing 41 and a lower air guide wing 42 for substantially controlling the vertical wind direction are each rotatably connected to the front end portions of the upper rear wing 31 and the lower rear wing 32 by hinges.

In addition, an upper rail 51 and a lower rail 52 which are rail structures for rotating the upper air guide wing 41 and the lower air guide wing 42 are formed on both side walls within the air duct 20.

More specifically, the upper rail 51, which is configured to guide the upper air guide wing 41 to rotate downward when the upper rear wing 31 moves forward, is formed at the upper position of both side walls (front position of the upper guide rail) within the air duct 20, and the lower rail 52, which is configured to guide the lower air guide wing 42 to rotate upward when the lower rear wing 32 moves forward, is formed at the lower position of both side walls (front position of the lower guide rail) within the air duct 20.

At this time, the upper rail 51 is formed of a rail structure in which an upper guide pin 41-1 formed on the side end portion of the upper air guide wing 41 can be slidably moved forward and backward, and is formed to have the downward tilted trajectory from the rear end and the front end in order to induce the downward rotation of the upper air guide wing 41.

In addition, the lower rail 52 is formed of a rail structure in which a lower guide pin 42-1 formed on the side end portion of the lower air guide wing 42 can be slidably moved forward and backward, and is formed to have the upward tilted trajectory from the rear end and the front end in order to induce the upward rotation of the lower air guide wing 42.

Here, a drive link device 60 configured to linearly move the upper rear wing 31 and the lower rear wing 32 is arranged at positions corresponding to the rear end portions of the upper rear wing 31 and the lower rear wing 32 on the side walls within the air duct 20.

The drive link device 60 is connected to the rear end portions of the upper rear wing 31 and the lower rear wing 32 by hinges and is rotatably arranged on the side walls within the air duct 20 to serve to linearly move the upper rear wing 31 and the lower rear wing 32 in different directions.

To this end, the drive link device 60 is configured to include a first link 61 which has a rotary shaft 61-1, which is connected to an actuator 70, formed on one side center portion thereof, a second link 62 which is provided as a structure in which a lower opening pocket 62-1 into which the upper end portion of the first link 61 is accessibly inserted is formed to be hinge-fastened to the rear end portion of the upper rear wing 31, and a third link 63 which is provided as a structure in which an upper opening pocket 63-1 into which the lower end portion of the first link 61 is accessibly inserted is formed to be hinge-fastened to the rear end portion of the lower rear wing 32.

In one embodiment, the actuator 70 may be a motor for providing rotational power to the first link 61, and is located outside the air duct 20 so that the output shaft thereof is connected to the rotary shaft 61-1 of the first link 61.

Alternatively, the actuator 70 may be a manual operation mechanism (for example, lever) for rotating the first link 61.

At this time, when the first link 61 is rotated at a proper angle or more, the upper end portion of the first link 61 may be separated from the lower opening pocket 62-1 of the second link 61, and the lower end portion of the first link 61 may be separated from the upper opening pocket 63-1 of the third link 63.

Accordingly, the first link 61 is preferably rotated at a predetermined angle for preventing separation while preventing the phenomenon in which the upper end portion and the lower end portion of the first link 61 are separated from the lower opening pocket 62-1 and the upper opening pocket 63-1.

To this end, a first slot 61-2 and a second slot 61-3 are each formed on the upper end portion and the lower end portion of the first link 61, a first pin 62-2, which is inserted into the first slot 61-2 to be slidably transferred, is formed at the inlet of the lower opening pocket 62-1 of the second link 62, and a second pin 63-2, which is inserted into the second slot 61-3 to be slidably transferred, is formed at the inlet of the upper opening pocket 63-1 of the third link 63.

Accordingly, when the first link 61 conducts the rotation tilted in the left and right direction with being vertically arranged, the upper end portion and the lower end portion of the first link 61 are gradually separated from the lower opening pocket 62-1 of the second link 62 and the upper opening pocket 63-1 of the third link 63, respectively, but the second pin 63-2 of the third link 63 is locked to the outer end portion of the second slot 61-3 of the first link 61 while the first pin 62-2 of the second link 62 is locked to the outer end portion of the first slot 61-2 of the first link 61, such that it is possible to prevent separation of the upper end portion and the lower end portion of the first link 61 from the lower opening pocket 62-1 and the upper opening pocket 63-1.

Here, the operation flow for the air vent device according to the present disclosure having the above configuration will be described as follows.

Control of the Air Wind Direction in Neutral Direction (Linear Direction)

Figure 3:
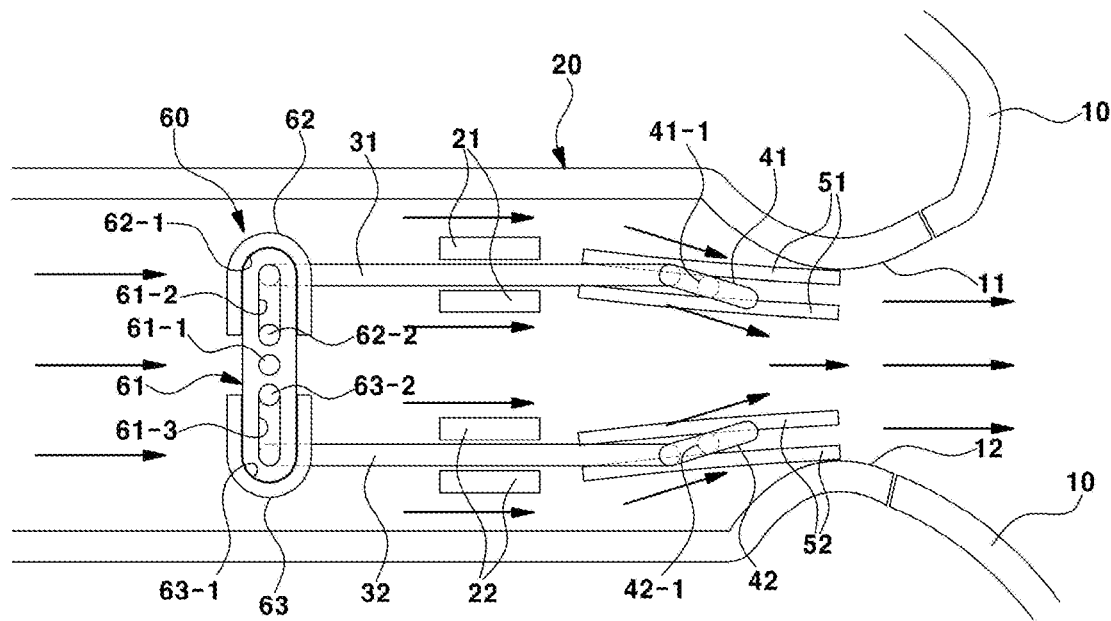
FIG. 3 is a side cross-sectional diagram illustrating a state where the air is discharged in a straight direction by the air vent device for the vehicle according to the present disclosure.

FIG. 3 illustrates a state where the air is discharged in a neutral direction (linear direction) by the air vent device for the vehicle according to the present disclosure.

In order to discharge the air passing through the air duct 20 from an air conditioner toward the interior in the linear wind, the first link 61 maintains the vertically arranged state.

In addition, the second link 62 and the third link 63 which are located on the upper end portion and the lower end portion of the first link 61 also maintain the vertically arranged state.

In addition, the upper rear wing 31 hinge-fastened to the second link 62 and the lower rear wing 32 hinge-fastened to the third link 63 maintain a state in which the upper rear wing 31 and the lower rear wing 32 are arranged parallel to each other within the air duct 20.

Accordingly, the air flows along the direction toward the interior through the main flow path of air which is a space between the upper rear wing 31 and the lower rear wing 32, a space between the upper rear wing 31 and the upper plate portion of the air duct 20, and a space between the lower rear wing 32 and the lower plate portion of the air duct 20.

Subsequently, the air may be discharged to the interior while forming the linear wind without being tilted upward or downward through a space between the upper air guide wing 41 and the upper plate portion of the air duct 20 and a space between the lower air guide wing 42 and the lower plate portion of the air duct 20, in addition to a space between the upper air guide wing 41 and the lower air guide wing 42.

Control of the Air Wind Direction Upward

Figure 4:
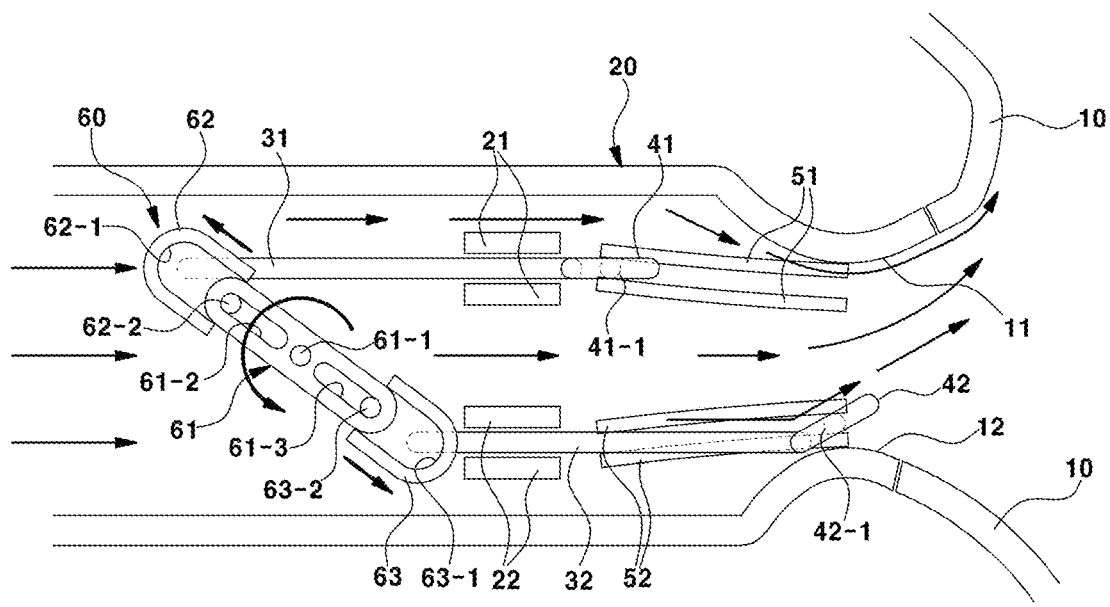
FIG. 4 is a side cross-sectional diagram illustrating a state where the air is discharged upward by the air vent device for the vehicle according to the present disclosure.

FIG. 4 illustrates a state where the air is discharged upward by the air vent device for the vehicle according to the present disclosure.

In order to control the air discharged to the interior to have the upward wind direction, the rotational force in one direction due to the driving of the actuator 70 is delivered to the rotary shaft 61-1 of the first link 61, such that the first link 61 may be rotated counterclockwise in the azimuth illustrated in FIG. 4.

At the same time, when the first link 61 is rotated counterclockwise, the second link 62 with the upper end portion of the first link 61 inserted and fastened is tilted and moved backward, and the third link 63 with the lower end portion of the first link 61 inserted and fastened is also tilted and moved forward.

At this time, the lower end portion of the first link 61 is also separated from the upper opening pocket 63-1 of the third link 63 while the upper end portion of the first link 61 is separated from the lower opening pocket 62-1 of the second link 62, such that the vertical distance between the upper rear wing 31 hinge-fastened to the second link 62 and the lower rear wing 32 hinge-fastened to the third link 63 may be kept constant without being changed.

In addition, as the second link 62 is tilted and moved backward, the upper rear wing 31 hinge-fastened to the second link 62 linearly moves backward, and as the third link 63 is tilted and moved forward, the lower rear wing 32 hinge-fastened to the third link 63 linearly moves forward.

In addition, as the upper rear wing 31 linearly moves backward, the upper air guide wing 41 hinge-fastened to the front end portion of the upper rear wing 31 also moves backward at the same distance.

Particularly, as the lower rear wing 32 linearly moves forward, the lower air guide wing 42 hinge-fastened to the front end portion of the lower rear wing 32 also moves forward at the same distance, and moves while rotating upward.

More specifically, the lower rail 52 has an upward tilted trajectory from the rear end portion toward the front end portion in order to induce the upward rotation of the lower air guide wing 42, such that when the lower guide pin 42-1 of the lower air guide wing 42 slidably moves forward along the lower rail 52, the lower air guide wing 42 is eventually rotated at a predetermined angle upward.

Accordingly, the lower air guide wing 42 rotates upward when the lower guide pin 42-1 is moved from the rear end portion of the lower rail 52 to the front end portion thereof while moving forward together when the lower rear wing 32 moves forward, thereby guiding the air discharged to the interior upward.

At this time, since the upper end portion of the outlet of the air duct 20 and the garnish 10 being in close contact therewith form the downward convex curved surface 11 in order to induce the COANDA effect, a portion of the air flowing along the interior of the air duct 20 from the air conditioner flows upward from the interior along the downward convex curved surface 11.

As described above, the lower air guide wing 42 may guide the wind direction of the air upward while rotating upward when the lower rear wing 32 moves forward, thereby easily controlling the interior discharge direction of the air upward, and furthermore, a portion of the air may flow upward from the interior along the downward convex curved surface 11 formed by the upper end portion of the outlet of the air duct 20 and the garnish 10 being in close contact therewith, thereby controlling the interior discharge direction of the air upward more easily.

Control of the Air Wind Direction Downward

Figure 5:
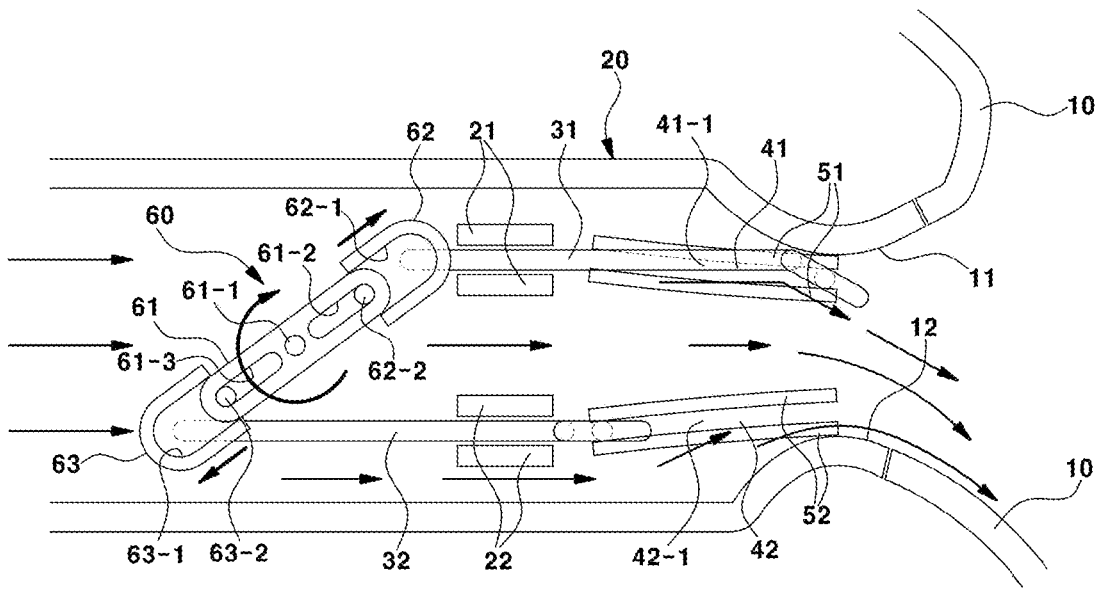
FIG. 5 is a side cross-sectional diagram illustrating a state where the air is discharged downward by the air vent device for the vehicle according to the present disclosure.

FIG. 5 illustrates a state where the air is discharged downward by the air vent device for the vehicle according to the present disclosure.

The rotational force in the other direction due to the driving of the actuator 70 is delivered to the rotational shaft 61-1 of the first link 61 in order to control the air discharged to the interior to have the downward wind direction, such that the first link 61 may be rotated clockwise in the illustrated azimuth illustrated in FIG. 5.

At the same time, when the first link 61 rotates clockwise, the second link 62 with the upper end portion of the first link 61 inserted and fastened is tilted and moved forward, and the third link 63 with the lower end portion of the first link 61 inserted and fastened is also tilted and moved backward.

Likewise, the lower end portion of the first link 61 is also separated from the upper opening pocket 63-1 of the third link 63 while the upper end portion of the first link 61 is separated from the lower opening pocket 62-1 of the second link 62, such that the vertical distance between the upper rear wing 31 hinge-fastened to the second link 62 and the lower rear wing 32 hinge-fastened to the third link 63 may be kept constant without being changed.

In addition, as the second link 62 is tilted and moved forward, the upper rear wing 31 hinge-fastened to the second link 62 linearly moves forward, and as the third link 63 is tilted and moved backward, the lower rear wing 32 hinge-fastened to the third link 63 linearly moves backward.

In addition, as the lower rear wing 32 linearly moves backward, the lower air guide wing 42 hinge-fastened to the front end portion of the lower rear wing 32 also moves backward at the same distance.

Particularly, as the upper rear wing 31 linearly moves forward, the upper air guide wing 41 hinge-fastened to the front end portion of the upper rear wing 31 also moves forward at the same distance, and moves while rotating downward.

More specifically, the upper rail 51 has a downward tilted trajectory from the rear end portion toward the front end portion in order to induce the downward rotation of the upper air guide wing 41, such that when the upper guide pin 41-1 of the upper air guide wing 41 slidably moves forward along the upper rail 51, the upper air guide wing 41 is eventually rotated at a predetermine angle downward.

Accordingly, the upper air guide wing 41 rotates downward when the upper guide pin 41-1 is moved from the rear end portion of the upper rail 51 to the front end portion thereof while moving forward together when the upper rear wing 31 moves forward, thereby guiding the air discharged to the interior upward.

At this time, since the lower end portion of the outlet of the air duct 20 and the garnish 10 being in close contact therewith form the upward convex curved surface 12 in order to induce the COANDA effect, a portion of the air flowing along the interior of the air duct 20 from the air conditioner flows downward from the interior along the upward convex curved surface 12.

As described above, the upper air guide wing 41 guides the wind direction of the air downward while rotating downward when the upper rear wing 31 moves forward, thereby easily controlling the interior discharge direction of the air downward, and furthermore, a portion of the air flows downward from the interior along the upward convex curved surface 12 formed by the lower end portion of the outlet of the air duct 20 and the garnish 10 being in close contact therewith, thereby controlling the interior discharge direction of the air downward more easily.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. An air vent device for a vehicle comprising:
    an upper rear wing and a lower rear wing which are mounted to an upper portion and a lower portion within an air duct, respectively, wherein the upper rear wing and the lower rear wing are configured to be moveable in a longitudinal direction of the air duct;
    an upper air guide wing and a lower air guide wing which are rotatably mounted to the front end portions of the upper rear wing and the lower rear wing, respectively;
    a drive link device rotatably mounted to the side walls within the air duct while being connected to the rear end portions of the upper rear wing and the lower rear wing to linearly move the upper rear wing and the lower rear wing in opposite directions with respect to the longitudinal direction of the air duct;
    an actuator mounted to the outside of the air duct to provide the rotation power to the drive link device;
    an upper rail which is formed on the side wall within the air duct to guide the downward rotation of the upper air guide wing when the upper rear wing moves forward; and
    a lower rail formed on the side wall within the air duct to guide the upward rotation of the lower air guide wing when the lower rear wing moves forward;
    wherein the drive link device comprises:
        a first link which has a rotary shaft, which is connected to the actuator, formed on one side center portion thereof;
        a second link provided as a structure in which a lower opening pocket into which the upper end portion of the first link is accessibly inserted, and the second link is hinge-fastened to the rear end portion of the upper rear wing; and
        a third link provided as a structure in which an upper opening pocket into which the lower end portion of the first link is accessibly inserted, and the third link is hinge-fastened to the rear end portion of the lower rear wing.

2. The air vent device for the vehicle of claim 1, wherein a first slot and a second slot are each formed on the upper end portion and the lower end portion of the first link, a first pin, which is inserted into the first slot to be slidably transferred, is formed at the inlet of the lower opening pocket of the second link, and a second pin, which is inserted into the second slot to be slidably transferred, is formed at the inlet of the upper opening pocket of the third link.

3. The air vent device for the vehicle of claim 1, wherein an upper guide rail configured to support the forward and backward linear movement of the upper rear wing is formed on the upper side wall within the air duct.

4. The air vent device for the vehicle of claim 1, wherein a lower guide rail configured to support the forward and backward linear movement of the lower rear wing is formed on a lower side wall within the air duct.

5. The air vent device for the vehicle of claim 1, wherein the upper rail is formed on the upper side wall within the air duct so that the side end portion of the upper air guide wing is coupled to be slidably moved.

6. The air vent device for the vehicle of claim 5, wherein the upper rail is formed of a rail structure in which the upper guide pin formed on the side end portion of the upper air guide wing is inserted to be slidably moved forward and backward, and is formed to have a downward tilted trajectory toward an outlet of the air duct.

7. The air vent device for the vehicle of claim 6, wherein the upper air guide wing rotates downward when the upper guide pin is moved from the rear end portion of the upper rail to the front end portion thereof while moving forward together with the upper rear wing when the upper rear wing moves forward to guide the air discharged to the interior downward.

8. The air vent device for the vehicle of claim 1, wherein the lower rail is formed on a lower side wall within the air duct so that the side end portion of the lower air guide wing is coupled to be slidably moved.

9. The air vent device for the vehicle of claim 8, wherein the lower rail is formed of a rail structure in which the lower guide pin formed on the side end portion of the lower air guide wing is inserted to be slidably moved forward and backward, and is formed to have an upward tilted trajectory from the rear end portion toward an outlet of the air duct.

10. The air vent device for the vehicle of claim 9, wherein the lower air guide wing rotates upward when the lower guide pin is moved from the rear end portion of the lower rail to the front end portion thereof while moving forward together with the lower rear wing when the lower rear wing moves forward to guide the air discharged to the interior upward.

11. The air vent device for the vehicle of claim 1, wherein the upper end portion of the outlet of the air duct and a garnish being in contact with one another are formed of a downward convex curved surface for a COANDA effect.

12. The air vent device for the vehicle of claim 1, wherein the lower end portion of the outlet of the air duct and a garnish being in contact with one another are formed of an upward convex curved surface for a COANDA effect.

* * * * *